United States Patent [19]

Sullivan

[11] 4,130,792
[45] Dec. 19, 1978

[54] METAL DETECTOR WITH FEEDBACK TUNING

[76] Inventor: John W. Sullivan, 2040 Middlefield Rd., Apt. 9, Mountain View, Calif. 94040

[21] Appl. No.: 838,096

[22] Filed: Sep. 30, 1977

[51] Int. Cl.² .............................................. G01V 3/08
[52] U.S. Cl. ....................................... 324/3; 324/236
[58] Field of Search ................... 324/3, 67, 228, 229, 324/233, 234, 236, 237, 239, 240; 340/38 L, 258 B, 258 C

[56] References Cited

U.S. PATENT DOCUMENTS

| | | | |
|---|---|---|---|
| 3,201,774 | 8/1965 | Uemura | 324/3 X |
| 3,202,909 | 8/1965 | Stewart | 324/3 |
| 3,346,856 | 10/1967 | Doble et al. | 340/38 L X |
| 3,373,374 | 3/1968 | Marosi | 324/234 X |
| 3,400,365 | 9/1968 | French | 340/38 L |
| 3,451,041 | 6/1969 | Marosi et al. | 340/38 L |
| 3,685,013 | 8/1972 | Brickner | 340/38 L |
| 3,961,238 | 6/1976 | Randolph | 324/3 |

Primary Examiner—Gerard R. Strecker
Attorney, Agent, or Firm—Flehr, Hohbach, Test, Albritton & Herbert

[57] ABSTRACT

Metal detector of the type having a tuned sensing loop which undergoes a shift in resonance and Q when brought into proximity to metal objects. In the absence of metal objects, the detector operates in a closed loop mode in which negative feedback is utilized to offset errors and maintain the excitation signal at an optimum frequency. Upon detection of a metal object, the system switches to an open loop mode in which the excitation signal remains at the optimum frequency and the output signal varies in accordance with the proximity of the object.

3 Claims, 2 Drawing Figures

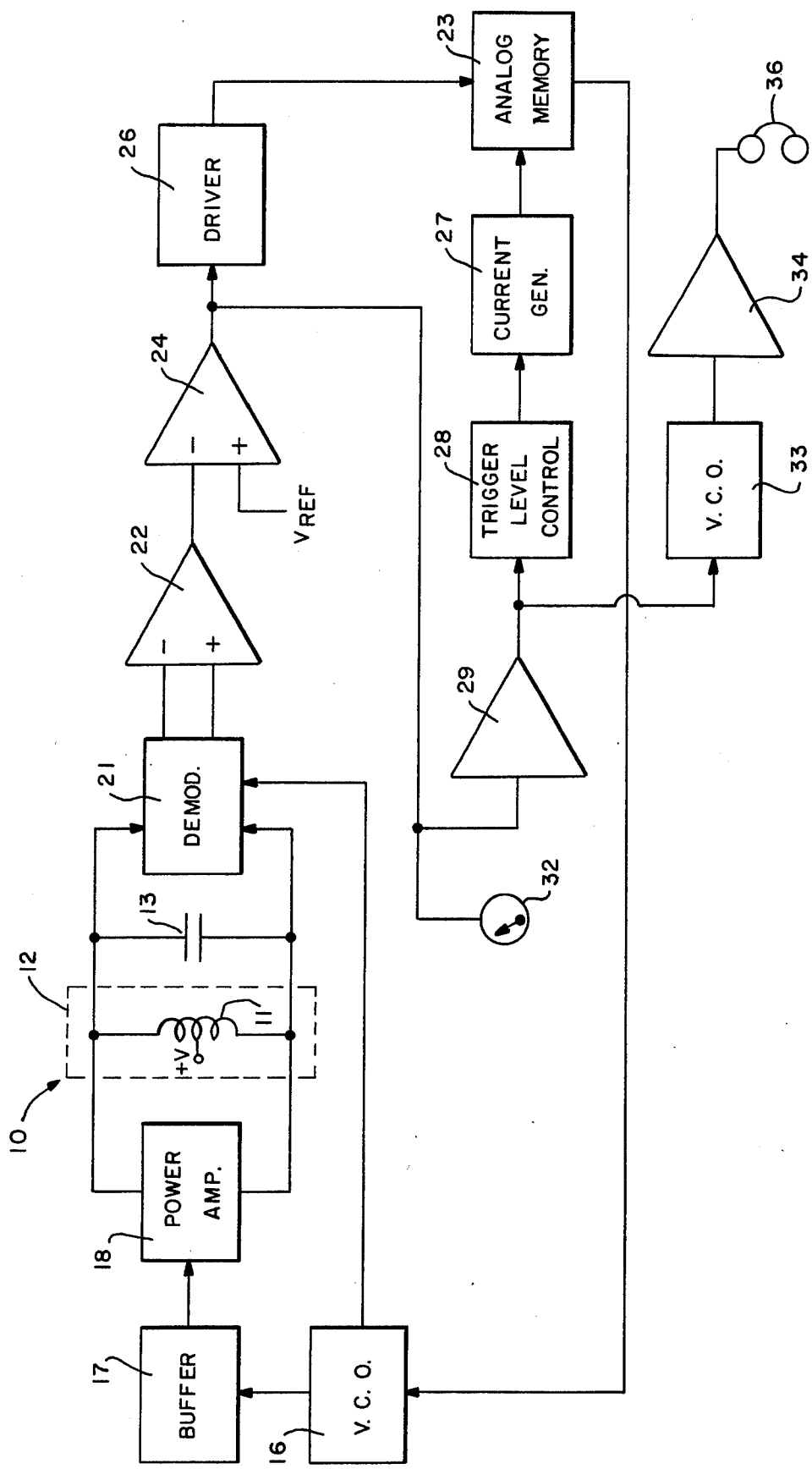
FIG.—1

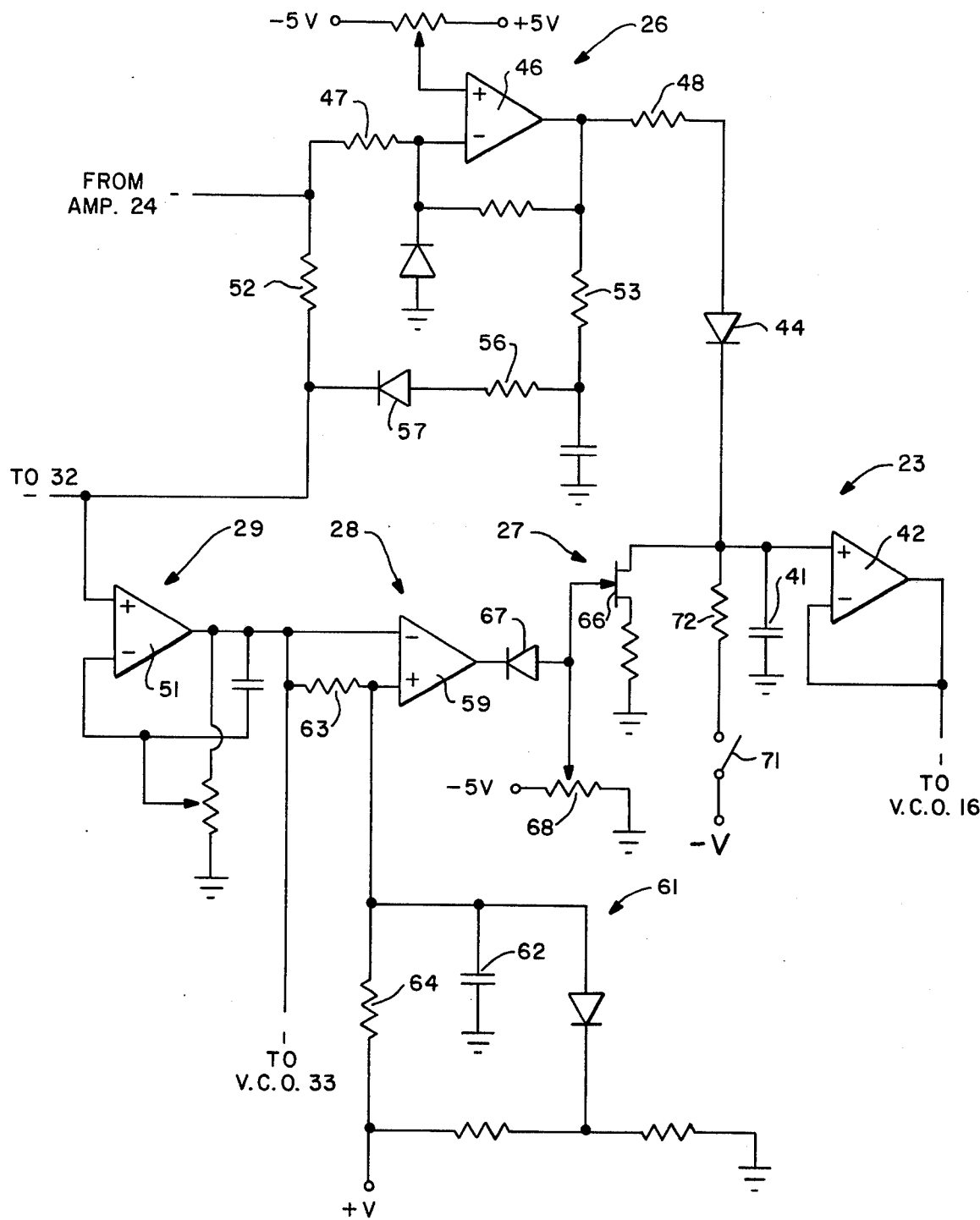
FIG.—2

METAL DETECTOR WITH FEEDBACK TUNING

BACKGROUND OF THE INVENTION

This invention pertains generally to metal detectors and more particularly to a metal detector of the type having a tuned sensing loop transducer which undergoes a shift in resonance and Q when brought into proximity to metal objects.

In such detectors, the transducer is driven by a signal which is slightly off the resonance frequency of the transducer. As metal objects alter the resonance and Q of the transcuer, the signal developed across the transducer undergoes changes in amplitude and phase which can be detected and used to drive lamps, voltmeters, audio systems and other indicators. The changes in inductance produced by a metal object can be quite small (e.g., 0.0001%), and an extremely sensitive system is required to detect such small changes. In prior art systems, noise and changes induced by temperature and power supply variations have prevented reliable operation at such levels.

SUMMARY AND OBJECTS OF THE INVENTION

The invention provides a highly sensitive metal detector which effectively overcomes the problems which have limited the sensitivity of prior art systems. In the absence of metal objects, the detector operates in a closed loop mode in which negative feedback is utilized to offset errors and maintain the excitation signal at an optimum frequency. Upon detection of metal objects, the system switches to an open loop mode in which the excitation signal remains at the optimum frequency and the output signal varies in accordance with the proximity of the object.

It is in general an object of the invention to provide new and improved metal detector.

Another object of the invention is to provide a metal detector of the above character having a closed loop mode of operation for maintaining an optimum operating frequency prior to the detection of a metal object and an open loop mode of operation at the optimized frequency once the object is detected.

Additional objects and features of the invention will be apparent from the following description in which the preferred embodiment is set forth in detail in conjunction with the accompanying drawings.

IN BRIEF DESCRIPTION OF THE DRAWINGS

FIG. 1 is a block diagram of one embodiment of a metal detector according to the invention.

FIG. 2 is a detailed circuit diagram of a portion of the metal detector of FIG. 1.

DESCRIPTION OF THE PREFERRED EMBODIMENT

As illustrated in FIG. 1, the metal detector includes a metal sensing transducer 10 which comprises a multiple turn wire loop or coil 11 enclosed in a Faraday Shield 12. In a detector intended primarily for use in locating coins, pipes, and other valuable objects buried in the ground, the sensing loop has a diameter on the order 3 to 24 inches and is mounted on a rod (not shown) for movement across the ground or other search area. A capacitor 13 is connected across the sensing loop to form a tuned circuit having a resonant frequency on the order of 100 to 200 KHz.

A variable frequency excitation signal is generated for the transducer by a voltage-controlled oscillator 16. The output of the oscillator is connected to the input of a buffer stage 17, and the output of this stage is connected to the input of a power amplifier 18. The power amplifier preferably has a balanced output, with a high output impedance, and the transducer is connected to the output of this amplifier. Oscillator 16 has a frequency range which is centered slightly away from the resonant frequency of the transducer. In the preferred embodiment, the oscillator operates on the low frequency side of resonance with a nominal operating frequency at the −3db point of the transducer. For example, with a transducer which is resonant at 150 KHz, the oscillator could operate at 147 KHz.

The signal developed across transducer 10 is applied to a full-wave phase sensitive demodulator 21 of standard design. The demodulator receives a carrier input from oscillator 16, and the demodulator responds in both amplitude and phase to all signals that are phase coherent with the carrier signal. In the preferred embodiment, the transducer is connected to the demodulator by high value resistors (not shown) to minimize the loading of the tuned circuit. With light loading, the circuit can have a very high Q. In addition to increasing the amplitude of the signal from the transducer, the demodulator also provides a high degree of noise reduction by rejecting all noise and other extraneous signals which are not in phase with the carrier signal. The full-wave rectified signal from demodulator 21 is applied to the inputs of a differential amplifier 22.

Means is provided for monitoring the output signal from differential amplifier 22 and maintaining this signal at predetermined level in the absence of metal objects proximity to the transducer. This means includes an analog memory 23 in which a control signal for oscillator 16 is stored. This means also includes a differential reference amplifier 24 which has a (−) input connected to the output of amplifier 22 and (+) input connected to a reference voltage source $V_{Ref}$. The output of the reference amplifier is connected to a driver 26 which serves to increase the level of the memory signal when the output signal from amplifier 22 exceeds the reference level.

Means is also provided for continuously reducing the level of the memory signal at a predetermined rate in the absence of metal objects. This means includes a current generator 27, the operation of which is controlled by a trigger level control 28. The output signal from amplifier 24 is amplified and applied to the input of the trigger level control by an output amplifier 29, and the operation of the trigger level control is such that the current generator reduces the memory signal as long as the amplified signal from amplifier 24 remains below a trigger level set by the trigger level control.

The metal detector has two modes of operation: a closed loop mode in which the oscillator frequency is adjusted to maintain the output signal from amplifier 22 at the reference level and an open loop mode in which the oscillator frequency is maintained substantially constant and the output signal from amplifier 22 varies in accordance with the proximity of the transducer to a metal object. The closed loop mode is employed prior to the detection of a metal object, and the open loop mode is employed once an object has been detected.

Means is included for providing both visual and audible indications of the proximity of a metal object. This means includes a voltage responsive meter 32 connected to the output of amplifier 24 and a voltage controlled audio oscillator 33 connected the output of amplifier 29. The output of oscillator 33 is connected to the input of an audio amplifier 34, and the output of this amplifier is connected to an output device such as headphones 36.

In general, the operation of the systems is as follows. Since the oscillator operates on the low side of transducer resonance, an increase in the frequency of the excitation signal will result in an increased output voltage from the transducer. The polarities are such that an increase in the transducer voltage results in a decrease in the voltage at the output of amplifier 24. This decrease is inverted by driver 26 and results in an increase in the level of the memory signal. The memory signal controls the operating frequency of the oscillator, and the increase in this signal reduces the oscillator frequency to cancel the original increase. The feedback action is such that the signal at the output of amplifier 22 is maintained at a reference level $V_{Ref}$ in the absence of metal objects.

During the closed loop mode of operation, the memory signal is continuously reduced at a relatively low rate by current generator 27. This causes a decreasing voltage at the output of amplifier 24 which results in an increase in the memory signal. The theoretical waveform at the output of amplifier 24 is a saw tooth with a fast rise and a slow decay. The amplitude of this wave form is preferably kept quite small, e.g. a few millivolts, so that system variations can be corrected almost instanteously.

When a metal object is detected, the transducer loop voltage will decrease sharply, and the voltage at the output of amplifier 24 will increase accordingly. If this increase is faster than the rate at which current generator 27 is decreasing the memory voltage, the voltage at the output of amplifier 24 will continue to rise in the positive direction. When it rises a few millivolts, driver 26 is cut off, and the memory signal is no longer increased. Current generator 27, however, continues decreasing the memory signal, and the voltage at the output of amplifier 24 continues to rise. When this voltage reaches the threshold level set by trigger level control 28, the level control turns off current generator 27, and thereafter the memory voltage and oscillator frequency remain contant. The voltage at the output of amplifier 24 now varies in accordance with the proximity of the transducer to the metal object.

When the transducer is moved away from the metal object, the voltage at the output of amplifier 24 falls, and driver 26 and current generator 27 once again begin increasing and decreasing the memory signal to return the voltage at the output of amplifier 22 to the reference level.

Referring now to FIG. 2, the memory and the portions of the system for switching between the open and closed loop modes of operation are shown in detail. The memory includes a capacitor 41 connected between ground and the noninverting input of a FET operational amplifier 42. This amplifier is connected in a follower configuration, and the signal developed on capacitor 41 is applied to oscillator 16 as a control signal.

In the absence of metal objects, capacitor 41 may receive charge from driver 26 through diode 44. The driver includes an operational amplifier 46, and the output signal from reference amplifier 24 is applied to the inverting input of amplifier 46 by a resistor 47. The output of amplifier 46 is connected to the anode of diode 44 by a resistor 48. The cathode of the diode is connected to the ungrounded side of capacitor 41.

In operation, amplifier 46 inverts the output signal from reference amplifier 24, and whenever the anode of diode 44 is at a sufficiently positive voltage, capacitor 41 receives charge from the driver stage at a rate corresponding to the level of the signal from amplifier 24. When the output of the driver stage is zero or less than the positive voltage on capacitor 41, the capacitor receives no charge from the driver.

Output amplifier 29 comprises an operational amplifier 51 to which the output signal from reference amplifier 24 is applied through a resistor 52. This resistor is part of a network which cancels the effect of the voltage offset produced by driver amplifier 46 and prevents this offset from causing saturation of output amplifier 51. The other elements in the network include a resistor 53 and a capacitor 54 connected in series between the output of amplifier 46 and ground. A resistor 56 and a diode 57 are connected between the junction of resistor 53 and capacitor 54 and the output amplifier side of resistor 52. Depending upon the conditions in the system, the voltage on memory capacitor 41 is typically in the range of +1 to +4 volts. For a driver amplifier gain of 300 and capacitor voltage of 3 volts, the output form reference amplifier 24 must be at a level of −10 millivolts. Output amplifier 51 typically has a gain on the order of 1000, and without the offset compensating network, the output amplifier would be driven to saturation by the −10 millivolt signal at the output of amplifier 24. With the network, however, the −10 millivolt offset is cancelled in resistor 52, and the output of amplifier 51 remains at approximately 0 volts. The presence of capacitor 54 enables the network to adjust to the level of the offset voltage, giving the network a desirable dynamic characteristic.

The output of amplifier 51 is connected to the (−) input of a voltage comparator 59 in trigger level control 28. A reference signal is applied to the (+) input of comparator 59 by a dymamic reference source 61. This source comprises a capacitor 62 which is connected between the comparator input and ground. A resistor 63 is connected between the output of amplifier 51 and the ungrounded side of capacitor 62, and a resistor 64 is connected between a voltage source +V and the ungrounded side of the capacitor. With the output of amplifier 51 at 0 volts, capacitor 62 is charged to a relatively small positive voltage, e.g. +2 volts, determined by the magnitude of source voltage +V and the relative sizes of resistors 63 and 64. Upon signal induced saturation of amplifier 51, the capacitor is charged toward the full source voltage at the output of the amplifier. When the search loop is removed from the target area, the output of amplifier 51 goes back to Zero volts, but the charge on capacitor 62 is still around source voltage +V. As soon as amplifier 51 comes out of saturation, the output of comparator 59 will flip, turning on current generator 27. In effect, the system trigger level has changed in a favorable direction, allowing for larger drift errors than would be possible if the voltage at the (+) input of comparator 59 were fixed at some positive voltage, say +2 volts. In summary, the system trigger level moves in a dynamic fashion favorable to system operation.

Current generator 27 includes a field-effect transistor 66, and the output of comparator 59 is connected to the gate of this FET by a diode 67. The gate of the FET is also connected to a source of negative voltage by a variable resistor 68. With the comparator at positive saturation, diode 67 is back biased, and resistor 68 controls the amount of current flowing through the FET to memory capacitor 41. This current discharges the capacitor at a substantially constant rate regardless of the level of the voltage on the capacitor.

Means is included for rapidly discharging the memory capacitor to return the system to the closed loop mode of operation. This means includes a manually operable switch 71 and a resistor 72 connected between a negative voltage source $-V$ and the ungrounded side of capacitor 41.

Operation and use of the metal detector can now be described in detail. Initially, it is assumed that the system is operating in a closed loop mode in the absence metal objects in proximity to the transducer. In this mode, the output of amplifier 22 is very close to the level of reference voltage $V_{Ref}$ and the output of amplifier 24 is approximately zero. The output of amplifier 51 is below the trigger threshold level set by dynamic source 61, and comparator 59 is at positive saturation. Diode 67 is reversed biased, and memory capacitor 41 is discharged at a relatively low constant rate by current generator 27.

The decrease in the voltage on capacitor 41 causes an increase in the operating frequency of oscillator 16, and this results in an increase in the transducer voltage and a decrease in the voltage at the output of amplifier 24. The output voltage from amplifier 24 is inverted by driver amplifier 46 and applied to diode 44. When the anode of the diode rises to a sufficiently positive voltage, the memory capacitor receives charge from the driver stage at a rate corresponding to the level of the output signal from amplifier 24. This quickly offsets the discharging produced by current generator 27 and returns the output voltage from amplifier 22 to the reference level. This mode of operation continues as long as the rate of charging produced by the output of amplifier 24 is approximately equal to the rate of discharging produced by current generator 27, and this is generally the case in the absence of metal objects.

When a metal object is detected, the transducer voltage drops sharply at a rate far in excess of any temperature or power supply induced change. The decreased transducer voltage causes an increase in the signal voltage at the output of amplifier 24. As this voltage rises a few millivolts, the output of driver amplifier 46 is forced to zero, cutting off the charging current to the memory capacitor through diode 44. At this point, current generator 27 is still conducting, and the voltage at the output of amplifier 24 is continuing to rise.

When the voltage at the output of amplifier 51 reaches the trigger level (e.g. 2 volts) of comparator 59, the comparator switches, and applies a negative voltage to the gate of FET 66 which is sufficient to cut off the current generator. Thereafter, the voltage on the memory capacitor remains substantially constant, and the output voltage from reference amplifier 24 varies with the proximity of the transducer to the metal object. The system remains in this open loop mode of operation until the transducer is removed from the target area.

When the transducer is operating in the open loop mode, error terms such as temperature induced drift are not corrected. If the operator keeps the search loop in the target area for long periods of time, the following action may take place when the search loop is finally removed from the target area. If the accumulated error at the output of amplifier 24 is negative, the output voltage will shoot below the threshold level and the system will instantly correct itself to the system threshold level through diode 44. If the error is positive but below the trigger level of comparator 59, current generator 27 will turn on and slowly return the output of amplifier 22 to the reference level. If the voltage at the output of amplifier 51 is positive and greater than the trigger level of comparator 59, the system will remain in the open loop mode of operation. Targets can still be detected in this mode, but the system will not be at the optimum operating point for maximum sensitivity. In this situation, the system can be returned to the closed loop mode of operation simply by closing switch 71.

The dynamic action of reference source 61 also tends to prevent the system from remaining in the open loop mode when the transducer is removed from the target area. With the transducer in the target area and the output of amplifier 51 at positive saturation, capacitor 62 charges toward the positive source voltage. When the search loop is removed from the target area and the output of amplifier 51 returns to zero, but capacitor 62 remains charged at the source voltage. As soon as the output of amplifier 51 drops below this level, comparator 59 switches turning on the current generator.

The invention has a number of important features and advantages. In the closed loop mode of operation, changes due to temperature or power supply drift are cancelled, and the system remains at the optimum operating frequency. This results in a degree of sensitivity which has not been possible with the metal detectors of the prior art. In addition to being useful for locating buried objects such as cables, pipe, and treasure, the metal detector can be used in other applications such as locating metal fragments in or on the human body and detecting vehicles in a traffic control system.

With the invention, it is relatively easy to distinquish metal objects of interest from magnetic objects which could produce false indications with other metal detectors. A metal target in the field of search coil 11 has the effect of a shorted secondary turn. With highly conductive targets (e.g., sliiver, gold and copper), the primary effect of the target is a reduction of inductance and a decreasing transducer voltage.

For magnetic targets such as iron ore deposits, the permeability of the sensing loop will be affected, resulting in a voltage increase across the transducer. The system will treat this voltage increase as any other error, and it will be tuned out immediately by the negative feedback action. Thus, the system will discriminate betwwen metallic conductive targets and undesirable magnetic items such as iron bolts, nails, rusty bottle caps, and the like. For large iron objects, such as a pot, the conductive effects may exceed the magnetic effects and thus be detected as a conductive metal target. Very large deposits of iron can be detected in a negative sense by tracing the outlines of the targets in the following manner. As the search loop passes into the iron area, the system will retune and the audio signal will have a very low pitch during this retuning process. As the loop passes out of the iron area, the audio signal will increase in frequency. Upon finding that the search loop is moving between two different search mediums, the operator can outline the iron deposit.

This system requires no operator adjustable tuning elements. When the operating power is turned on, the system automatically tunes itself to the correct operating frequency. The start-up characteristics are as as follows. It is assumed that the resonant frequency of the transducer is 150 KHz and the 3db band width of the transducer is 6 KHz. Additionally, it is assumed that the operating point is at the −3db point, i.e. 147 KHz, and that the highest possible frequency that voltage controlled oscillator 16 can reach occurs when the voltage on memory capacitor 41 is zero. Finally it is assumed design constraints make the maximum frequency less than 153 KHz. Under these conditions, the output voltage across coil 11 is extremely high, reference amplifier 24 is in negative saturation and the driver amplifier 46 is a positive saturation, causing maximum charging current to flow into capacitor 41. As the voltage across capacitor 41 increases, the frequency of voltage controlled oscillator 16 decreases. During this tune-up period, the audio indication is a distinctive low frequency. As the system tunes up, oscillator 16 reaches the operating point (e.g., 147 KHz) and the output of reference amplifier 24 approaches zero volts, the system threshold level. As this happens, diode 44 turns off, and the system is now automatically tuned to its correct operating frequency.

It is apparent from the foregoing that a new and improved metal detector has been provided. While only the presently preferred embodiment has been described in detail, as will be apparent to those familiar with the art, certain changes and modifications can be made without departing from the scope of the invention as defined by the following claims.

I claim:

1. In a metal detector: a metal sensing transducer having a resonant frequency dependent upon proximity of the transducer to metal objects, controlled oscillator means for exciting the transducer with a signal of variable frequency to provide an output signal having a level corresponding to the frequency relationship between the excitation signal and the resonant frequency of the transducer, memory means comprising a capacitor connected to the oscillator means for storing a control signal which determines the frequency of the excitation signal, and means responsive to the output signal for adjusting the control signal to maintain the output signal at a predetermined level in the absence of metal objects and for maintaining the control signal at a predetermined frequency when a metal object is detected, said last named means comprising means for charging the capacitor in one direction at a predetermined rate, means for charging the capacitor in the other direction at a rate corresponding to the level of the output signal, and means for inhibiting charging of the capacitor when the output signal reaches a threshold level.

2. The metal detector of claim 3 wherein the means for inhibiting charging of the capacitor comprises means for providing a reference signal which is of a first level when the output signal is below said level and which follows the level of the output signal when the output signal is above the first level, and means including a comparator responsive to the output and reference signals for inhibiting the charging when the output signal is above the level of the reference signal.

3. In a metal detector: a metal sensing transducer having a resonant frequency dependent upon proximity of the transducer to metal objects, means including a controlled oscillator for exciting the transducer with a signal of variable frequency to provide an output signal having a level corresponding to the difference between the frequency of the excitation signal and the resonant frequency of the transducer, a memory capacitor connected to the control input of the oscillator for storing a signal which determines the operating frequency of the oscillator, first means responsive to the level of the output signal for charging the capacitor in one direction at a rate corresponding to the level of the output signal until the output signal reaches a first predetermined level, and second means responsive to the level of the output signal for charging the capacitor at a predetermined rate in the opposite direction until the output signal reaches a level beyond that normally reached by the output signal in the absence of metal objects in proximity to the transducer, the charge on the capacitor and the frequency of the excitation signal remaining substantially constant when the output signal is at the last named level.

* * * * *